United States Patent
Xu (10) Patent No.: US 11,860,748 B2
(45) Date of Patent: Jan. 2, 2024

(54) MEMORY TEST METHOD, MEMORY TEST APPARATUS, DEVICE AND STORAGE MEDIUM

(71) Applicant: CHANGXIN MEMORY TECHNOLOGIES, INC., Hefei (CN)

(72) Inventor: Xiaofeng Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/594,536

(22) PCT Filed: Aug. 5, 2021

(86) PCT No.: PCT/CN2021/110795
§ 371 (c)(1),
(2) Date: Mar. 23, 2023

(87) PCT Pub. No.: WO2022/078029
PCT Pub. Date: Apr. 21, 2022

(65) Prior Publication Data
US 2023/0236942 A1 Jul. 27, 2023

(30) Foreign Application Priority Data

Oct. 16, 2020 (CN) .......................... 202011110688.0

(51) Int. Cl.
*G06F 11/22* (2006.01)
(52) U.S. Cl.
CPC ...... *G06F 11/2273* (2013.01); *G06F 11/2205* (2013.01)

(58) Field of Classification Search
None
See application file for complete search history.

(56) References Cited

U.S. PATENT DOCUMENTS

| 10,628,274 B2 | 4/2020 | Gulati et al. |
| 2014/0157053 A1* | 6/2014 | Mozak .................. G11C 29/52 714/32 |

(Continued)

FOREIGN PATENT DOCUMENTS

| CN | 104484250 A | 4/2015 |
| CN | 110413462 A | 11/2019 |
| CN | 111417932 A | 7/2020 |

OTHER PUBLICATIONS

International Search Report and English translation cited in PCT/CN2021/110795 dated Nov. 4, 2021, 9 pages.

(Continued)

*Primary Examiner* — Guerrier Merant
(74) *Attorney, Agent, or Firm* — Cooper Legal Group, LLC (57) ABSTRACT

A memory test method, a memory test apparatus, a device and a storage medium are provided. The memory test method includes: obtaining a central processing unit (CPU) accessible space of a memory to-be-tested; obtaining a graphics processing unit (GPU) accessible space of the memory to-be-tested; and driving a CPU to run a test program based on the accessible space of the CPU, to access the memory to-be-tested through a bus of memory to-be-tested, when the CPU runs the test program, the CPU controls a GPU to access the memory to-be-tested based on the accessible space of the GPU through the bus of memory to-be-tested.

9 Claims, 6 Drawing Sheets (56) References Cited

U.S. PATENT DOCUMENTS

2015/0279485 A1    10/2015  Weksler et al.
2016/0154720 A1     6/2016  Li
2019/0318797 A1*   10/2019  Cha ........................ G11C 29/38
2021/0406143 A1*   12/2021  Chaiken .............. G06F 11/1048

OTHER PUBLICATIONS

Written Opinion and English translation cited in PCT/CN2021/110795 dated Nov. 4, 2021, 8 pages.

* cited by examiner

MEMORY TEST METHOD, MEMORY TEST APPARATUS, DEVICE AND STORAGE MEDIUM

CROSS-REFERENCE TO RELATED APPLICATIONS

The present disclosure is a national stage of International Patent Application No. PCT/CN2021/110795, filed on Aug. 5, 2021, which claims the priority to Chinese Patent Application No. 202011110688.0, titled "MEMORY TEST METHOD, MEMORY TEST APPARATUS, DEVICE AND STORAGE MEDIUM", and filed on Oct. 16, 2020. International Patent Application No. PCT/CN2021/110795 and Chinese Patent Application No. 202011110688.0 are herein incorporated into the present disclosure by reference.

TECHNICAL FIELD

The present disclosure relates to, but is not limited to, a memory test method, a memory test apparatus, a device and a storage medium.

BACKGROUND

As a process dimension of a semiconductor continues to shrink, and a scale of an integrated current design is becoming larger, a highly complex integrated circuit product is facing increasingly severe challenges such as high reliability and high quality requirements. A dynamic random access memory (DRAM) is an internal memory that directly exchanges data with a central processing unit (CPU), and can be read and written at any time. For example, a low-power double data rate synchronous dynamic random access memory (LPDDR SDRAM) is often applied to a system on a chip (SoC) of some handheld devices such as a mobile phone and a tablet computer. Therefore, a system-level stress test on a memory such an LPDDR SDRAM is very important.

SUMMARY

An overview of the subject matter detailed in the present disclosure is provided below, which is not intended to limit the protection scope of the claims.

According to a first aspect of the present disclosure, a memory test method is provided, including: obtaining an accessible space of a central processing unit (CPU) of a memory to-be-tested; obtaining an accessible space of a graphics processing unit (GPU) of the memory to-be-tested; and driving a CPU to run a test program based on the accessible space of the CPU, to access the memory to-be-tested through a bus of memory to-be-tested, when the CPU runs the test program, the CPU controls a GPU to access the memory to-be-tested based on the accessible space of the GPU through the bus of memory to-be-tested.

According to a second aspect of the present disclosure, a memory test system is provided, including: a CPU and a GPU, where: the CPU is configured to run a test program to access a memory to-be-tested based on an accessible capacity of an allocated CPU, when the CPU runs the test program, the CPU controls the GPU to access the memory to-be-tested based on an accessible capacity of an allocated GPU; and the GPU is configured to access the memory to-be-tested based on an accessible capacity of a GPU.

According to a third aspect of the present disclosure, a memory test apparatus is provided, including: a test preparation module, configured to obtain an accessible space of a CPU of a memory to-be-tested; and obtain an accessible space of a GPU of the memory to-be-tested; and a test running module, configured to drive a CPU to run a test program based on the accessible space of the CPU, to access the memory to-be-tested through a bus of memory to-be-tested, when the CPU runs the test program, the CPU controls a GPU to access the memory to-be-tested based on the accessible space of the GPU through the bus of memory to-be-tested.

According to a fourth aspect of the present disclosure, a device is provided, including: a memory, a processor, and executable instructions stored in the memory and capable of being run on the processor; when the processor executes the executable instructions, the memory test method described above is implemented.

According to a fifth aspect of the present disclosure, a computer readable storage medium having computer executable instructions stored thereon that, when the processor executes the executable instructions, the memory test method described above is implemented.

BRIEF DESCRIPTION OF THE DRAWINGS

The drawings incorporated into the specification and constituting a part of the specification illustrate the embodiments of the present disclosure, and are used together with the descriptions to explain the principles of the embodiments of the present disclosure. In these drawings, similar reference numerals are used to represent similar elements. The drawings in the following descriptions are some rather than all of the embodiments of the present disclosure. Those skilled in the art may derive other drawings based on these drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

A test of an LPDDR SDRAM in a system segment can be divided into, for example, three levels. A first level is, for example, a module of a memory built-in self-test (MBIST) included in a memory controller on an SoC. The MBIST can make some state-level tests on internal memory, which is a test for a DRAM, solidified in the SoC, and poorly configurable. A second level is, for example, a universal boot loader (Uboot) level. Test software at this level has better scalability and can test an entire memory array space. However, such a test generally requires an original support of the SoC and a development degree of an SoC manufacturer, and because the test runs on the SoC, a processing speed of the test is limited by a size of a static random access memory (SRAM) of the SoC. A third level is, for example, a test in a base of an Android/Linux system. The test on this level is closer to an applicable manner of a user, and test software have very good scalability and diversity, but cannot cover an entire memory space, because the Android/Linux system needs to occupy a large part of the memory space.

There may be two types of stress tests related to an Android/Linux base. One type is, for example, a test at an Android native layer, and the other type is, for example, a test made by image software such as 3DMark. Both of the two software test methods have certain defects. Input/Output (IO) access of the test at the native layer cannot be fully loaded, while the 3DMark software is used to test a GPU and is not configured to test the memory. Therefore, a related memory test algorithm cannot be implemented, and IO access of the memory cannot be fully loaded.

The present disclosure provides a memory test method, a CPU is driven to run a test program based on an accessible space of a CPU, to access a memory to-be-tested through a bus of memory to-be-tested, and when the CPU runs the test program, the CPU controls a GPU to access the memory to-be-tested based on an accessible space of a GPU through the bus of memory to-be-tested, thereby implementing a stress test with high access load on the memory and enhancing an effect of the memory test.

Figure 1:
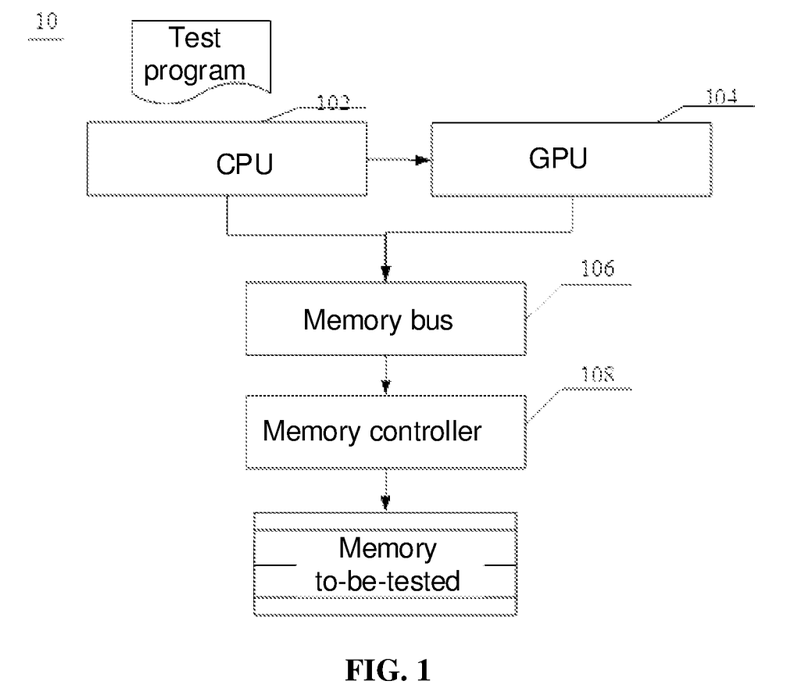
FIG. 1 is a schematic diagram of a system architecture according to an embodiment of the present disclosure.

FIG. 1 shows an exemplary system architecture 10 to which a memory test method or a memory test apparatus of the present disclosure is applicable.

As shown in FIG. 1, the system architecture 10 may include a CPU 102 and a GPU 104, and may further include a memory bus 106 and a memory controller 108. The parts of the system architecture 10 are described below.

As shown in FIG. 1, the CPU 102 may be configured to run a test program based on an accessible capacity of an allocated CPU to access a memory to-be-tested, when the CPU runs the test program, the CPU controls the GPU 104 to access the memory to-be-tested based on an accessible capacity of an allocated GPU. The memory (such as internal memory) test method performed by the CPU is a test performed by directly accessing the memory, and the entire test program can be run directly on the CPU. The CPU can operate the GPU through a universal interface of Open Graphics Library (OpenGL) or Open Computing Language (OpenCL). Test code run by the CPU uses such a universal interface to control the GPU to access the internal memory, to translate an internal memory test pattern of the CPU into image processing logic of the GPU, so that a test pattern of the GPU is consistent with that of the CPU.

In some embodiments, for example, items of the CPU test may be divided into three aspects. A first aspect is, for example, an array test; a second aspect is, for example, an IO test; and a third aspect is, for example, a state switching test. The array test mainly focuses on whether an array has some hardware errors (hard fail), such as detecting whether a bit flip occurs. The IO test may be divided into, for example, two types, a first type is, for example, a stress test of a command mode (Command line), such as detecting whether an input/output address flip occurs; and a second type is, for example, a stress test of a data bus mode (DQ bus line), such as detecting whether a transmit data flip occurs. The test of the DQ bus line is a main item of the stress test. The state switching test may be divided into two types of test items, where a first type is, for example, a switching suspend test, and a second type is, for example, a reboot test.

As shown in FIG. 1, the GPU 104 may be configured to access the memory to-be-tested based on the accessible capacity of the GPU. A GPU memory test mode is an indirect test mode. The GPU does not directly run test code. Instead, the test code is run on the CPU. The CPU runs to instruct the GPU to perform image processing, and the GPU accesses the memory to perform the related operation.

As shown in FIG. 1, the CPU 102 access a low-power internal memory through the bus of memory to-be-tested 106 by the memory controller; and the GPU 104 accesses the low-power internal memory through the bus of memory to-be-tested 106 by the memory controller. Regardless of whether the GPU or the CPU accesses the memory alone, there is a bus allocation problem, that is, a part is reserved for the other part and the memory bus 106 cannot be fully occupied. A joint test mode of the GPU and the CPU can enable stress on the memory test to reach a maximum value.

As shown in FIG. 1, the memory controller 108 may be, for example, an internal memory controller, configured to exchange data between the CPU and/or the GPU and memory to-be-tested, by which a maximum memory capacity, a type and speed of memory, a data width, and the like of the memory controlled by the controller can be obtained. A general memory controller can be used for DDR memory of different generations and models. For example, when the memory to-be-tested is a low-power internal memory (LPDDR), an enhanced general DDR memory controller can be used.

Figure 2:
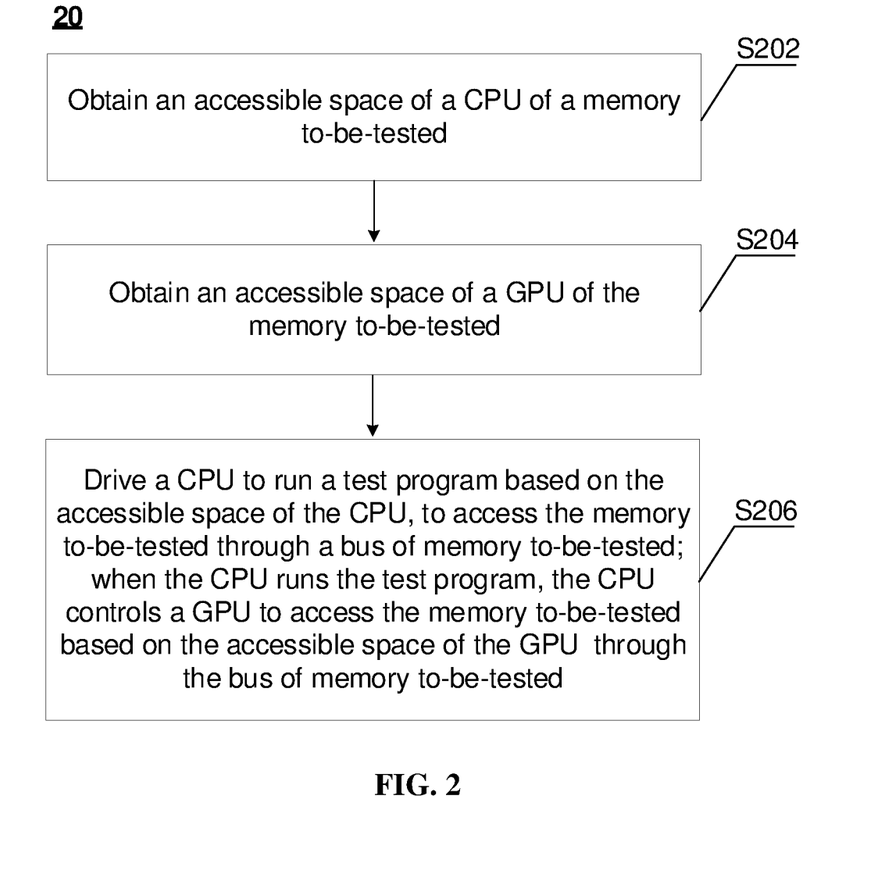
FIG. 2 is a flowchart of a memory test method according to an embodiment of the present disclosure.

FIG. 2 is a flowchart of a memory test method according to an exemplary embodiment. The memory test method shown in FIG. 2, may be, for example, applied to the system 10.

As shown in FIG. 2, the memory test method 20 provided in this embodiment of the present disclosure may include the following steps.

As shown in FIG. 2, in step S202, an accessible space of a CPU of a memory to-be-tested is obtained. The memory may include an internal memory and an external memory. The internal memory may include a register, a cache memory, and a main memory (usually referred to as internal memory). The external memory may include a hard disk, a floppy disk, an optical disk, or the like. The internal memory has a small capacity and a high speed, and is usually configured to temporarily store data and programs currently being executed. The external memory has a large capacity and a low speed, and is usually configured to store data and programs for a long time or permanently. The test method in the present disclosure can be used in various memories and is not limited herein.

As shown in FIG. 2, in step S204, an accessible space of a GPU of the memory to-be-tested is obtained.

In some embodiments, for example, when the memory to-be-tested is internal memory, memory information such as a passable address, a data volume, or a rate may be obtained before a test program is run, the internal memory may be allocated to the CPU and the GPU, and the CPU and the GPU may be set to be accessible to a capacity and an address of the memory to-be-tested. A CPU accessible capacity can be obtained based on the capacity of the memory to-be-tested, a GPU accessible capacity can be obtained based on the capacity of the memory to-be-tested, and addresses of corresponding internal memory can be allocated respectively.

As shown in FIG. 2, in step S206, the CPU is driven to run a test program based on the accessible space of the CPU, to access the memory to-be-tested through a bus of memory to-be-tested, when the CPU runs the test program, the CPU controls the GPU to access the memory to-be-tested based on the accessible space of the GPU through the bus of memory to-be-tested. An address access mode of the CPU can be converted, through a conversion interface, into a large block address access mode mapped by direct memory access (DMA) of the GPU, to implement conversion of test logic.

In some embodiments, for example, the CPU, based on the OpenCL, controls the GPU to access the memory to-be-tested in a predetermined access mode according to the test program. The CPU can control, based on OpenCL, the GPU to access the memory to-be-tested in the predetermined access mode according to the test program. OpenCL is a working standard for writing programs on heterogeneous parallel computing platforms, and can map heterogeneous computing to a CPU, a GPU, a field programmable gate array (FPGA), and other computing devices. OpenCL provides an abstract model of an underlying hardware structure and can provide a universal interface for developing an application. OpenCL can be used to write a general-purpose computing program that runs on the GPU, without mapping an algorithm thereof to an application programming interface of 3D graphics such as OpenGL or DirectX.

In some other embodiments, for example, the CPU can control, through an OpenCL or an OpenGL interface, the GPU to access the memory to-be-tested in a predetermined access mode according to the test program. OpenGL is a graphics application programming interface, including a software library that can access a graphics hardware device such as a GPU, and can implement an OpenGL interface on various different graphics hardware systems completely by software. GPU hardware developers need to provide implementations that meet OpenGL specifications, and these implementations are usually referred to as "drive", configured to translate OpenGL-defined application programming interface commands into GPU instructions.

According to the memory test method provided in this embodiment of the present disclosure, the CPU and the GPU are used to access the internal memory simultaneously for a stress test, to fully occupy the bus of memory to-be-tested as much as possible, thereby implementing a stress test with high access load on the memory and enhancing an effect of the memory test.

Figure 3:
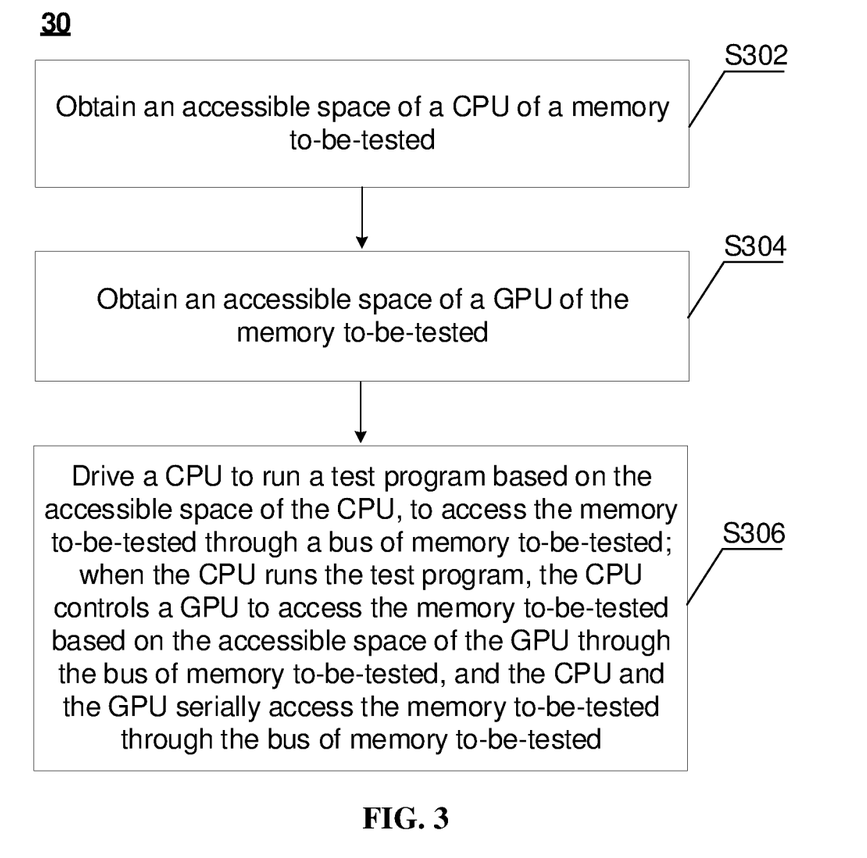
FIG. 3 is a flowchart of another memory test method according to an embodiment of the present disclosure.

FIG. 3 is a flowchart of another memory test method according to an exemplary embodiment. The memory test method shown in FIG. 3 may be, for example, applied to the foregoing system 10.

As shown in FIG. 3, the memory test method 30 provided in this embodiment of the present disclosure may include the following steps.

As shown in FIG. 3, in step S302, an accessible space of a CPU of a memory to-be-tested is obtained.

As shown in FIG. 3, in step S304, an accessible space of a GPU of the memory to-be-tested is obtained.

For some specific implementations of steps S302 and S304, reference may be made to steps S202 and S204, and details are not described herein again.

As shown in FIG. 3, in step S306, the CPU is driven to run a test program based on the accessible space of the CPU, to access the memory to-be-tested through a bus of memory to-be-tested, when the CPU runs the test program, the CPU controls the GPU to access the memory to-be-tested based on the accessible space of the GPU through the bus of memory to-be-tested, and the CPU and the GPU serially access the memory to-be-tested through the bus of memory to-be-tested. The bus of memory to-be-tested may be, for example, an advanced extensible interface (AXI) bus including a predetermined transmission path, and the CPU and the GPU, according to the test program, serially access the memory to-be-tested through the predetermined transmission path.

In some embodiments, for example, the AXI bus includes five independent transmission paths, that is, a read address path, a read data path, a write address path, a write data path, and a write reply path. The CPU and the GPU access the internal memory such as an LPDDR by the AXI bus in a serial manner, that is, transmission is performed in chronological order on a same transmission path. During firmware configuration of a memory chip, a part may be reserved for each of the CPU and the GPU, that is, if the internal memory is accessed by the CPU or the GPU separately for testing, a remaining part of the bus is not occupied. The CPU and the GPU simultaneously read and write to their respective memory spaces to access the internal memory at the same time, so that an AXI bus clock can be fully occupied to maximize an IO test of the internal memory.

According to the memory test method provided in this embodiment of the present disclosure, the CPU and the GPU are used to access the internal memory simultaneously for a stress test, to fully occupy the bus of memory to-be-tested as much as possible, thereby maximizing the stress test of the memory and enhancing an effect of the memory test.

Figure 4:
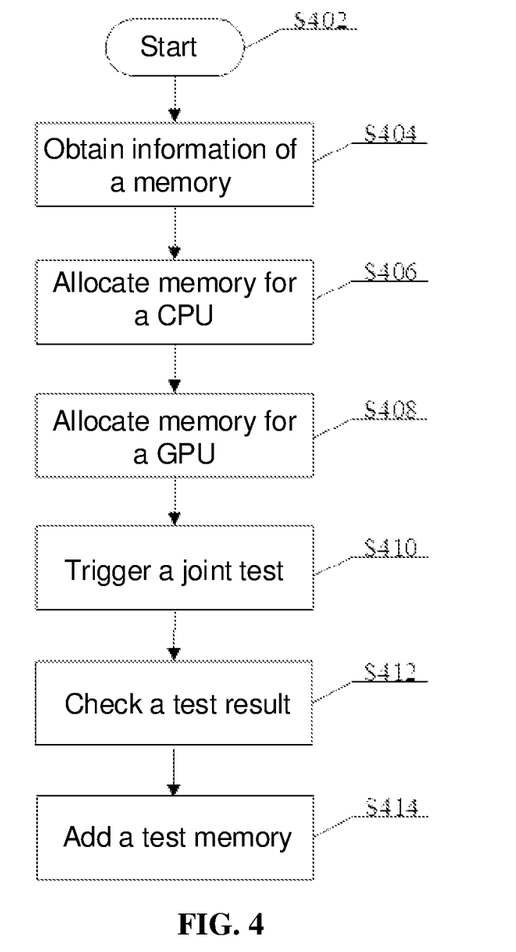
FIG. 4 is a flowchart of a memory test according to FIG. 1 to FIG. 3.

FIG. 4 is a flowchart of a memory test according to FIG. 1 to FIG. 3. As shown in FIG. 4: After a procedure starts (S402), first obtain information of a memory (S404), then allocate a memory space for a CPU based on the information of the memory (S406), and allocate a memory space for a GPU (S408); after memory allocation is completed, trigger a joint test of the CPU and the GPU (S410), then check a test result (S412); and after the test result indicates that the test is completed, perform a next memory test (S414), and return to step S402.

Figure 5:
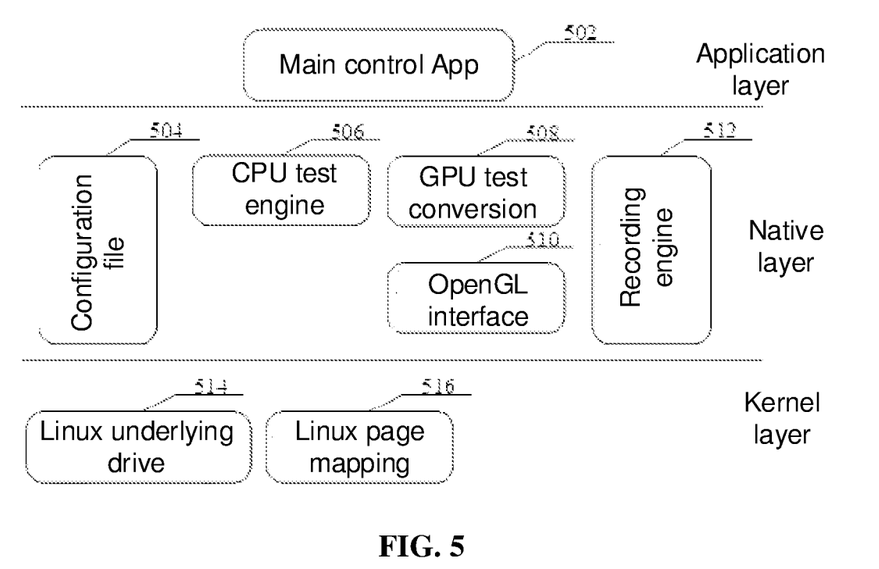
FIG. 5 is an architectural diagram of an implementation platform of a memory test according to an exemplary embodiment.

FIG. 5 is an architectural diagram of an implementation platform for a memory test according to an exemplary embodiment. As shown in FIG. 5, using an Android base as an example, a memory test can be implemented by calling a drive at a native layer by an Android application (APP). The entire implementation is divided into three parts. A first part is a main control App 502 of an Android application layer. This part is the main control of the entire test. A second part is to implement conversion of a test program of a GPU, and GPU test conversion 508 converts a test mode of a CPU into an operation procedure of the GPU by an OpenGL interface 510. A third part is that a CPU test engine 506 runs a test program of a CPU. Because both the second part and the third part are at the native layer of Android, both parts need external interfaces to be called by the main control of the first part. The main control App 502, through related application programming interfaces, controls the second part and the third part to perform related operations. The native layer may further include a configuration file 504, a recording engine 512, and the like. Because debugging and test results need to be retained, a log of the test needs to be stored for the test, and the log can be retained in a/data file of Android by the recording engine 512.

The implementation in FIG. 5 can be implemented only when root user (root) permission of Android is granted, and a developer mode is enabled.

As shown in FIG. 5, using a Linux base as an example, a Linux APP may be directly used to access a virtual address space, and a page lock of a Linux page mapping 516 at a kernel layer is used for testing, or an APP may be used to call a Linux underlying drive (kernel mode drive) 514 to complete the memory test.

Figure 6:
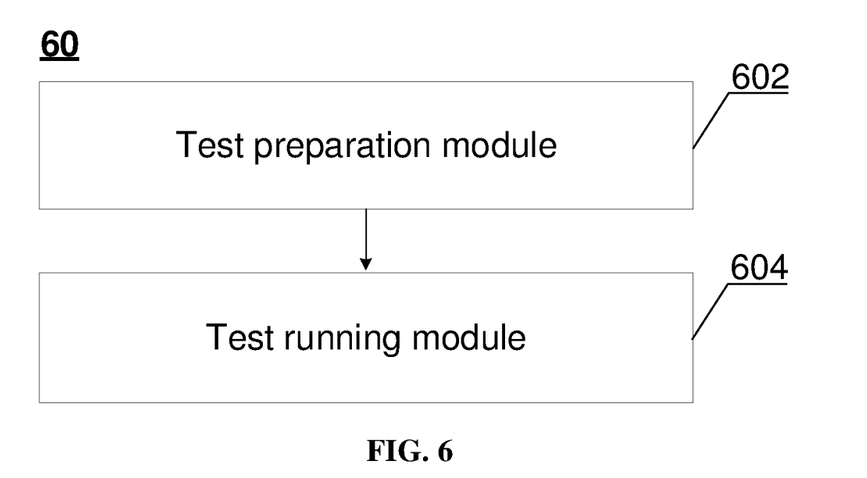
FIG. 6 is a block diagram of a memory test apparatus according to an exemplary embodiment.

FIG. 6 is a block diagram of a memory test apparatus according to an exemplary embodiment. The apparatus shown in FIG. 6 may be, for example, applied to the foregoing system 10.

As shown in FIG. 6, the apparatus 60 provided in this embodiment of the present disclosure may include a test preparation module 602 and a test running module 604.

As shown in FIG. 6, the test preparation module 602 may be configured to obtain an accessible space of a CPU of a memory to-be-tested; and obtain an accessible space of a GPU of the memory to-be-tested.

As shown in FIG. 6, the test running module 604 may be configured to drive a CPU to run a test program based on the accessible space of the CPU, to access the memory to-be-tested through a bus of memory to-be-tested, when the CPU runs the test program, the CPU controls a GPU to access the memory to-be-tested based on the accessible space of the GPU through the bus of memory to-be-tested.

As shown in FIG. 6, the test running module 604 may be further configured to drive the CPU and the GPU to serially access the memory to-be-tested through the bus of memory to-be-tested. The bus of memory to-be-tested is an AXI bus including a predetermined transmission path.

As shown in FIG. 6, the test running module 604 may be further configured to drive the CPU and the GPU, according to the test program, to serially access the memory to-be-tested through the predetermined transmission path.

As shown in FIG. 6, the test running module 604 may be further configured to drive the CPU to control, based on an OpenCL, the GPU to access the memory to-be-tested in a predetermined access mode according to the test program.

As shown in FIG. 6, the test running module 604 may be further configured to control, by the CPU through an OpenGL interface, the GPU to access the memory to-be-tested in a predetermined access mode according to the test program.

The memory to-be-tested is, for example, a low-power internal memory.

As shown in FIG. 6, the test running module 604 may be further configured to drive the CPU to access the low-power internal memory through the bus of memory to-be-tested by a memory controller. When the CPU runs the test program, the CPU controls the GPU to access the low-power internal memory through the bus of memory to-be-tested by the memory controller.

For a specific implementation of each module in the apparatus provided in this embodiment of the present disclosure, reference may be made to the content in the foregoing method, and details are not described herein again.

Figure 7:
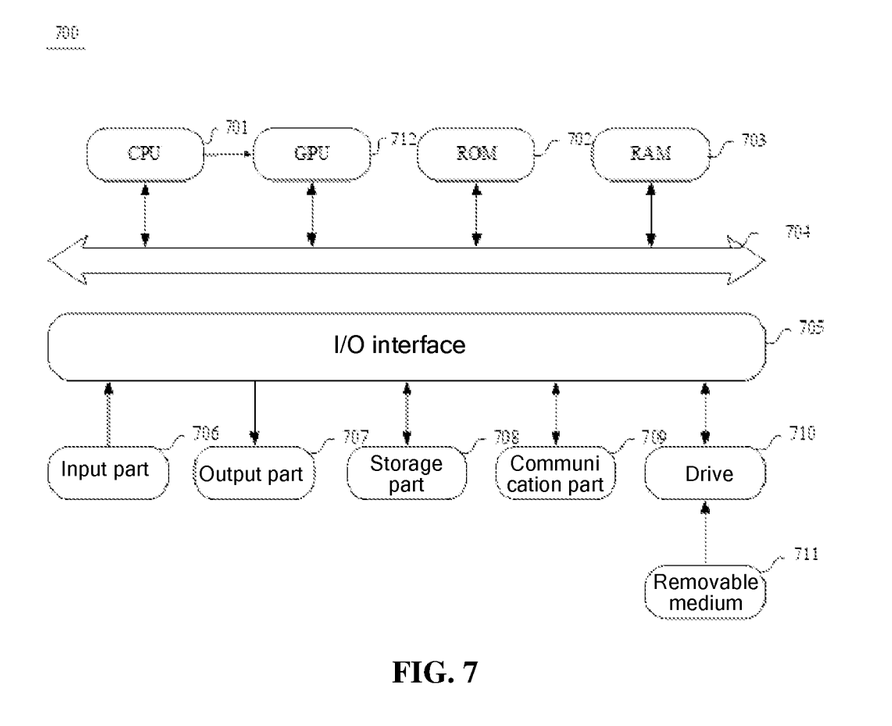
FIG. 7 is a schematic structural diagram of an electronic device according to an embodiment of the present disclosure.

FIG. 7 is a schematic structural diagram of an electronic device according to an embodiment of the present disclosure. The device shown in FIG. 7 only uses a computer system as an example, and should not bring any limitation to a function and a scope of use of this embodiment of the present disclosure.

As shown in FIG. 7, the device 700 includes a CPU 701, which can perform various appropriate actions and processing based on a program stored in a read-only memory (ROM) 702 or a program loaded from a storage portion 708 into a random access memory (RAM) 703, for example, can execute a test program to test a connected LPDDR. A GPU 712 may be further included, and the CPU 701 may control the GPU to test a connected memory. The RAM 703 further stores various programs and data required for operations of the device 700. The CPU 701, the ROM 702, and the RAM 703 are connected to one another by a bus 704. An input/output (I/O) interface 705 is also connected to the bus 704. The CPU 701, the ROM 702, the RAM 703, the I/O 705, the GPU 712, and the like may be integrated on an SoC as needed.

As shown in FIG. 7, the following components are connected to the I/O interface 705: an input part 706 including a keyboard and a mouse; an output part 707 including a cathode ray tube (CRT), a liquid crystal display (LCD), and a speaker; a storage part 708 including a hard disk; and a communication part 709 including a network interface card such as a LAN card and a modem. The communication part 709 performs communication processing by a network such as the Internet. A drive 710 is also connected to the I/O interface 705 as needed. A removable medium 711, such as a magnetic disk, an optical disk, a magneto-optical disk, or a semiconductor memory, is mounted on the drive 710 as needed, so that a computer program read therefrom is installed into the storage part 708 as needed.

As shown in FIG. 7, according to this embodiment of the present disclosure, the process described above with reference to the flowchart may be implemented as a computer software program. For example, this embodiment of the present disclosure includes a computer program product, which includes a computer program carried on a computer readable medium, and the computer program includes program code configured to perform the memory test method shown in the flowchart. In such an embodiment, the computer program may be downloaded and installed from the network through the communication part 709, and/or may be installed from the removable medium 711. When the computer program is executed by the CPU 701, the foregoing functions defined in the system of the present disclosure are performed.

The computer readable medium shown in the present disclosure may be a computer readable signal medium or a computer readable storage medium or any combination thereof. The computer readable storage medium, may be, for example, but not limited to, electrical, magnetic, optical, electromagnetic, infrared, or semiconductor systems, apparatuses, or devices, or any combination thereof. More specific examples of the computer readable storage medium may include, but are not limited to: an electrical connection with one or more conducting wires, a portable computer disk, a hard disk, a RAM, a ROM, an erasable programmable ROM (an EPROM or a flash memory), an optical fiber, a portable compact disk read-only memory (CD-ROM), an optical storage device, a magnetic storage device, or any suitable combination thereof. In the present disclosure, the computer readable storage medium may be any tangible medium that contains or stores a program, and the program may be used by or in combination with an instruction execution system, apparatus, or device. In the present disclosure, the computer readable signal medium may include a data signal propagated in a baseband or as a part of a carrier, and computer readable program code is carried therein. The propagated data signal may be in various forms, including but not limited to an electromagnetic signal, an optical signal, or any suitable combination thereof. The computer readable signal medium may alternatively be any computer readable medium other than the computer readable storage medium. The computer readable medium may send, propagate, or transmit a program configured to be used by or in combination with an instruction execution system, apparatus, or device. The program code contained on the computer readable medium may be transmitted using any suitable medium, including but not limited to: wireless, wire, optical fiber, RF, or any suitable combination thereof.

The flowcharts and block diagrams in the accompanying drawings illustrate architectures, functions, and operations of possible implementations of the system, method, and computer program product according to various embodiments of the present disclosure. In this regard, each block in the flowchart or block diagram can represent one module, program segment, or part of code, and the module, program segment, or part of the code contains one or more executable instructions configured to implement a defined logical function. It should also be noted that, in some alternative implementations, the functions marked in the blocks may alternatively occur in a different order from that marked in the accompanying drawings. For example, two successively shown blocks actually may be executed in parallel substantially, or may be executed in reverse order sometimes, depending on the functions involved. It should also be noted that, each block in the block diagram or flowchart and the combination of the blocks in the block diagram or the flowchart may be implemented by a dedicated hardware-based system that performs a defined function or operation, or may be implemented by a combination of dedicated hardware and computer instructions.

The modules described in the embodiments of the present disclosure may be implemented in a form of software or in a form of hardware. The describe modules may alternatively be disposed in the processor, and this, for example, may be described as follows: A processor includes a test preparation module and a test running module. Names of the modules do not constitute any limitation on the modules. For example, the test preparation module may be alternatively described as "a module that obtains a memory allocation parameter from a connected terminal".

In another aspect, the present disclosure further provides a computer readable medium. The computer readable medium may be included in the device described in the foregoing embodiment; or may exist along without being assembled into the device. The computer readable medium carries one or more programs, and when the one or more programs are executed by a device, the device is caused to include: obtaining an accessible space of a CPU of a memory to-be-tested; obtaining an accessible space of a GPU of the memory to-be-tested; and driving the CPU to run a test program based on the accessible space of the CPU, to access the memory to-be-tested through a bus of memory to-be-tested, when the CPU runs the test program, the CPU controls the GPU to access the memory to-be-tested based on the accessible space of the GPU through the bus of memory to-be-tested.

In the description of the specification, the description with reference to terms such as "an embodiment", "an illustrative embodiment", "some implementations", "an illustrative implementation" and "an example" means that the specific feature, structure, material or feature described in combination with the implementation(s) or example(s) is included in at least one implementation or example of the present disclosure.

In this specification, the schematic expression of the above terms does not necessarily refer to the same implementation or example. Moreover, the described specific feature, structure, material or characteristic may be combined in an appropriate manner in any one or more implementations or examples.

It should be noted that in the description of the present disclosure, the terms such as "center", "top", "bottom", "left", "right", "vertical", "horizontal", "inner" and "outer" indicate the orientation or position relationships based on the drawings. These terms are merely intended to facilitate description of the present disclosure and simplify the description, rather than to indicate or imply that the mentioned device or element must have a specific orientation and must be constructed and operated in a specific orientation. Therefore, these terms should not be construed as a limitation to the present disclosure.

It can be understood that the terms such as "first" and "second" used in the present disclosure can be used to describe various structures, but these structures are not limited by these terms. Instead, these terms are merely intended to distinguish one element from another.

The same elements in one or more drawings are denoted by similar reference numerals. For the sake of clarity, various parts in the drawings are not drawn to scale. In addition, some well-known parts may not be shown. For the sake of brevity, the structure obtained by implementing multiple steps may be shown in one figure. In order to make the understanding of the present disclosure more clearly, many specific details of the present disclosure, such as the structure, material, size, processing process and technology of the device, are described below. However, as those skilled in the art can understand, the present disclosure may not be implemented according to these specific details.

Finally, it should be noted that the above embodiments are merely intended to explain the technical solutions of the present disclosure, rather than to limit the present disclosure. Although the present disclosure is described in detail with reference to the above embodiments, those skilled in the art should understand that they may still modify the technical solutions described in the above embodiments, or make equivalent substitutions of some or all of the technical features recorded therein, without deviating the essence of the corresponding technical solutions from the scope of the technical solutions of the embodiments of the present disclosure.

INDUSTRIAL APPLICABILITY

The present disclosure discloses a memory test method, a memory test apparatus, a device and a storage medium. This method implements a stress test with high access load on a memory and enhances an effect of the memory test.

The invention claimed is:

1. A memory test method, comprising:
obtaining an accessible space of a central processing unit of a memory to-be-tested comprising obtaining an accessible capacity, based on a capacity of the memory to-be-tested, of the memory to-be-tested and that is accessible by the central processing unit, and obtaining an address of the accessible capacity of the memory to-be-tested and accessible by the central processing unit;
obtaining an accessible space of a graphics processing unit of the memory to-be-tested comprising obtaining an accessible capacity, based on the capacity of the memory to-be-tested, of the memory to-be-tested and that is accessible by the graphics processing unit, and obtaining an address of the accessible capacity of the memory to-be-tested and accessible by the graphics processing unit; and driving the central processing unit to run a test program based on the accessible space of the central processing unit, to access the memory to-be-tested through a bus of memory to-be-tested, wherein when the central processing unit runs the test program, the central processing unit controls the graphics processing unit to access the memory to-be-tested based on the accessible space of the graphics processing unit through the bus of memory to-be-tested, the central processing unit and the graphics processing unit serially access the memory to-be-tested simultaneously through the bus of memory to-be-tested; and the bus of memory to-be-tested is an advanced extensible interface bus comprising a predetermined transmission path.

2. The memory test method according to claim 1, wherein the central processing unit and the graphics processing unit serially access the memory to-be-tested through the bus of memory to-be-tested comprises:

the central processing unit and the graphics processing unit, according to the test program, serially access the memory to-be-tested through the predetermined transmission path.

3. The memory test method according to claim 1, wherein, when the central processing unit runs the test program, the central processing unit controls the graphics processing unit to access the memory to-be-tested based on the accessible space of the graphics processing unit through the bus of memory to-be-tested comprises:

the central processing unit, based on an open computing language, controls the graphics processing unit to access the memory to-be-tested in a predetermined access mode according to the test program.

4. The memory test method according to claim 1, wherein, when the central processing unit runs the test program, the central processing unit controls the graphics processing unit to access the memory to-be-tested based on the accessible space of the graphics processing unit through the bus of memory to-be-tested comprises:

the central processing unit, through an open graphics library interface, controls the graphics processing unit to access the memory to-be-tested in a predetermined access mode according to the test program.

5. The memory test method according to claim 1, wherein the memory to-be-tested comprises a low-power internal memory; and the accessing the memory to-be-tested through the bus of memory to-be-tested comprises:

the central processing unit accesses the low-power internal memory through the bus of memory to-be-tested by a memory controller; and when the central processing unit runs the test program, the central processing unit controls the graphics processing unit to access the memory to-be-tested based on the accessible space of the graphics processing unit through the bus of memory to-be-tested comprises:

the graphics processing unit accesses the low-power internal memory through the bus of memory to-be-tested by the memory controller.

6. A memory test system, comprising a central processing unit and a graphics processing unit, wherein:

the central processing unit is configured to run a test program to access a memory to-be-tested based on an accessible capacity of an allocated central processing unit; when the central processing unit runs the test program, the central processing unit controls the graphics processing unit to access the memory to-be-tested based on an accessible capacity of an allocated graphics processing unit, the central processing unit and the graphics processing unit serially access the memory to-be-tested simultaneously through a bus of memory to-be-tested; and the bus of memory to-be-tested is an advanced extensible interface bus comprising a predetermined transmission path; and the graphics processing unit is configured to access the memory to-be-tested based on the accessible capacity of the allocated graphics processing unit; wherein obtaining the accessible capacity of the allocated central processing unit comprises obtaining an accessible capacity, based on a capacity of the memory to-be-tested, of the memory to-be-tested and that is accessible by the central processing unit, and obtaining an address of the accessible capacity of the memory to-be-tested and accessible by the central processing unit; and obtaining the accessible capacity of the allocated graphics processing unit comprises obtaining an accessible capacity, based on the capacity of the memory to-be-tested, of the memory to-be-tested and that is accessible by the graphics processing unit, and obtaining an address of the accessible capacity of the memory to-be-tested and accessible by the graphics processing unit.

7. A memory test apparatus, comprising:

a test preparation module, configured to obtain an accessible space of a central processing unit of a memory to-be-tested, comprising obtaining an accessible capacity, based on a capacity of the memory to-be-tested, of the memory to-be-tested and that is accessible by the central processing unit, and obtaining an address of the accessible capacity of the memory to-be-tested and accessible by the central processing unit; and obtain an accessible space of a graphics processing unit of the memory to-be-tested, comprising obtaining an accessible capacity, based on the capacity of the memory to-be-tested, of the memory to-be-tested and that is accessible by the graphics processing unit, and obtaining an address of the accessible capacity of the memory to-be-tested and accessible by the graphics processing unit; and a test running module, configured to drive the central processing unit to run a test program based on the accessible space of the central processing unit, to access the memory to-be-tested through a bus of memory to-be-tested, wherein when the central processing unit runs the test program, the central processing unit controls the graphics processing unit to access the memory to-be-tested based on the accessible space of the graphics processing unit through the bus of memory to-be-tested, the central processing unit and the graphics processing unit serially access the memory to-be-tested simultaneously through the bus of memory to-be-tested; and the bus of memory to-be-tested is an advanced extensible interface bus comprising a predetermined transmission path.

8. A device, comprising: a memory, a processor, and executable instructions stored in the memory and configured to run on the processor; wherein, when the processor executes the executable instructions, the memory test method according to claim 1 is implemented.

9. A non-transitory computer readable storage medium having computer executable instructions stored thereon that, wherein, when a processor executes the computer executable instructions, the memory test method according to claim 1 is implemented.

\* \* \* \* \*